United States Patent [19]

Ko et al.

[11] Patent Number: 4,746,403

[45] Date of Patent: May 24, 1988

[54] HIGH TEMPERATURE PAPER-LIKE MATERIALS

[75] Inventors: Kenneth K. Ko; Shelly S. Niznik; Thomas M. Tymon, all of Lancaster; Richard A. Brubacker, Willow Street, all of Pa.

[73] Assignee: Armstrong World Industries, Inc., Lancaster, Pa.

[21] Appl. No.: 833,248

[22] Filed: Feb. 27, 1986

Related U.S. Application Data

[63] Continuation-in-part of Ser. No. 742,878, Jun. 10, 1985.

[51] Int. Cl.$^4$ .............................................. D21H 1/08
[52] U.S. Cl. ................................... 162/108; 162/145; 162/152; 162/158; 162/181.6
[58] Field of Search ...................... 162/158, 108, 181.5, 162/181.6, 181.1, 145, 152, 157.1, 107; 501/2, 3; 65/30.14; 106/287.17, 287.3; 428/241, 260

[56] References Cited

U.S. PATENT DOCUMENTS

| | | | |
|---|---|---|---|
| 2,248,636 | 7/1941 | Marsden | 106/287.3 |
| 2,795,545 | 6/1957 | Gluesenkamp | 162/168.2 |
| 3,325,340 | 6/1967 | Walker | 162/3 |
| 3,540,892 | 11/1970 | Lard | 106/15 |
| 4,239,519 | 12/1980 | Beall et al. | 501/3 |
| 4,450,095 | 5/1984 | Finlayson | 106/287.17 |
| 4,454,237 | 6/1984 | Hoda et al. | 502/2 |
| 4,455,382 | 6/1984 | Wu | 501/2 |
| 4,549,931 | 10/1985 | Adamowicz et al. | 162/158 |

*Primary Examiner*—Peter Chin

[57] ABSTRACT

Disclosed are fire-resistant paper-like materials. These materials are prepared by embedding a fabric in a layered inorganic silicate matrix that has an average charge per structural unit that ranges from about $-0.4$ to $-1$ and which contains at least some interstitial cations that are selected from the group consisting of guanidine and multiamine derived cations.

22 Claims, No Drawings

HIGH TEMPERATURE PAPER-LIKE MATERIALS

CROSS-REFERENCE TO RELATED APPLICATION

This application is a continuation-in-part of U.S. application Ser. No. 742,878, filed June 10, 1985 in the name of Kenneth K. Ko et al, and entitled "High Temperature Paper-Like Materials," now abandoned.

There is a need in the art for fire-resistant paper-like materials which are suitable for writing, typing and the like and which exhibit good mechanical properties, high temperature stability and water resistance, flexibility, smoothness and the "feel" of paper. In addition to having obvious utility as high security papers, such materials would be adaptable to many uses, such as, for example, a protective material in packaging, thermal insulators, electrical insulators and decorative wall panels.

The materials of the present invention which have the properties as specified above are comprised of fabrics embedded in (which term is, for the purpose of the present specification and claims, used interchangeably with "coated with") an inorganic layered silicate matrix, which matrix is a layered silicate that has an average charge per structural unit that ranges from about $-0.4$ to about $-1$, said silicate containing at least some interstitial cations that are selected from the group consisting of guanidine and multiamine derived cations. These materials are alternatively referred to in the present specification and claims as "embedded fabrics" or "embedded fabric materials."

The embedded fabric materials of the present invention are typically and preferably produced by a two-step process which comprises (1) contacting a fabric with a swelled layered silicate gel that has an average charge per structural unit that ranges from about $-0.4$ to about $-1$, said silicate containing exchangeable interstitial cations, and (2) flocculating the silicate in situ by contacting it with at least one species of guanidine, or closely related compounds thereto, and/or multiamine derived cations to thereby effect an ion exchange reaction between at least some of the exchangeable interstitial ions and at least some of the guanidine, or closely related compounds thereto, and/or multiamine derived cations and to form the inorganic layered silicate matrix.

Suitable examples of the swelled layered silicate gel which is used as a starting material to form the silicate matrix used in this invention include synthetic silicate mica materials. For example, U.S. Pat. No. 4,239,519 teaches the method for making certain precursor gellable silicates, which method comprises: (a) a fully or predominantly crystalline body is formed which contains crystals consisting essentially of a lithium and/or sodium water-swelling mica selected from the group of fluorhectorite, hydroxyl hectorite, boron flurophlogopite fluorphlogopite, hydroxyl boron phlogopite, and solid solutions between those and other structurally compatible species selected from the group of talc, fluortalc, polylithionite, fluorpolylithionite, phlogopite, and fluorphlogopite; (b) that body is contacted with a polar liquid, normally water, to cause swelling and disintegration of the body accompanied with the formation of a gel; and (c) the solid:liquid ratio of the gel is adjusted to a desired value depending upon the application therefor. Glass-ceramics are the preferred crystalline starting bodies. As another example of a synthetic layered silicate starting material, U.S. Pat. Nos. 4,067,819; 4,045,241; and 3,936,383 teach and discuss, respectively, synthetic tetra-silicic micas, synthetic taeniolites and a sol of synthetic hectorites.

Alternatively, U.S. Pat. Nos. 3,325,340 and 3,454,917 teach producing aqueous dispersions of vermiculite flaked crystals which may also be utilized as swelled layered silicate gel starting materials. These references teach swelling such crystals by introducing therein interstitial ions such as (1) alkylammonium cations having between 3 and 6 carbon atoms inclusive in each carbon group such as methylbutylammonium, n-butylammonium, propylammonium and iso-amylammonium, (2) the cationic form of aminoacids, such as lysine and ornithine, and/or (3) lithium.

The inorganic matrix that is utilized in the present invention can be prepared by contacting a silicate gel starting material as specified above with a source of exchange cations that are selected from guanidine, or closely related compounds thereto, and/or multiamine derivatives to thereby effect an ion exchange reaction between at least some of the starting material's interstitial cations and said guanidine and/or multiamine derived cations. The specific interstitial cations in the starting material will depend on the silicate gel being utilized. For example, if a synthetically derived gellable silicate, which is made according to the procedures of U.S. Pat. Nos. 4,239,519, or 4,067,819; 4,045,241; or 3,936,383 is utilized as a starting material, the interstitial cations will generally be $Li^+$ and/or $Na^+$ ions. If a natural vermiculite dispersion, such as made according to U.S. Pat. No. 3,325,340, is utilized, the interstitial cations will generally include alkylammonium cations and the other cations specified in U.S. Pat. No. 3,325,340. The silicate gel starting material, whether synthetic or natural in origin, will generally have morphologies that are represented by thin flakes which are generally disc, strip, and/or ribbons. Although we do not wish to be limited to any specific measurements for the flakes, they will typically have measurements which are from about 500 A to 100,000 A, and preferably 5,000 A to 100,000 A in length, 500 A to 100,000 A in width, and less than 100 A thick. The term "charge per structural unit" as used in the specification and claims refers to an average charge density as specified by G. Lagaly and A. Weiss, "Determination of Layer Charge in Mica - Type Layer Silicates," Proceedings of International Clay Conference, 61-80 (1969) and G. Lagaly, "Characterization of Clays by Organic Compounds," Clay Minerals, 16, 1-21 (1981).

The starting silicate gel can be made according to the afore-mentioned procedures of U.S. Pat. Nos. 4,239,519; 3,325,340; 4,067,819; 4,045,241; 3,936,383 or 3,434,917 or other methods which result in dissociated layer materials with charge densities in the desired ranges.

In this regard, it has been discovered that silicates with charge densities greater than about $-0.4$ (i.e., from about $-0.3$ to about 0) will not, when utilized in the present invention, give articles that display good durability. Starting materials with charge densities less than about -1 cannot be used in this invention because of the inability to prepare these materials in disperse form.

The term "guanidine, or closely related compounds thereto," is utilized herein to refer to compounds, and cations derived therefrom, that contain an aminomethyleneimine group $=N-C(-)=N-$, and especially an $=N-C(-C)=N-$ or $=N-C(-N)=N-$ group and resonance structures derived therefrom, in which there is a delocalized double bond. More especially, the cations will have the Formula $[R^1C(R^2)R^3]^+$, wherein $R^1$, $R^2$ and $R^3$ are independently selected from $NH_2$ and $CH_3$, provided that at least two of $R^1$, $R^2$ and $R^3$ are $NH_2$, and wherein one or more of the hydrogen atoms on any one or more of $R^1$, $R^2$ and $R^3$ may be replaced by substituents, for example $C_1$ to $C_5$ alkyl, $C_2$ to $C_5$ alkenyl or $C_2$ to $C_5$ alkynyl, and wherein one or more groupings of two of such substituents may be linked to form one or more rings, which may be saturated, unsaturated or aromatic. It will be appreciated that in the cation, there will be a positive charge which may be localized on one group or delocalized, giving a resonance structure, depending on the nature of the compound from which the cation is derived.

Examples of compounds from which the cations may be formed are guanidine, aminoguanidine, diaminoguanidine, methylguanidine, tetramethylguanidine, melamine, 2-aminopyridine and 2,6-diaminopyridine. The compounds may conveniently be used in the form of their hydrochlorides or any other corresponding compatible soluble salt. For the sake of brevity, the term "guanidine derived cations" will be used to collectively refer to "guanidine, or closely related compounds thereto," which are defined above.

The term "multiamine derived cations," when used in reference to the exchange cations that may be utilized in the present invention, refers to low molecular weight, non-polymeric, di, tri and/or tetra amino functional compounds, wherein the amine moieties have been modified, such as by being protonated, to thereby be positively charged. Diamines are the multiamine compounds of choice. The preferred diamines will generally correspond to the Formula.

$R_3N-(CX_2)_n-NR_3$ wherein (1) each R is independently selected from hydrogen, a $C_1-C_8$ straight or branched chain alkyl group, a $C_3-C_6$ acylic alkyl group, or an aryl group, with the proviso that there be no more than one aryl group on each nitrogen, (2) each X is independently selected from hydrogen, an alkyl group or an aryl group and (3) n represents an integer from 2 to 15, with the option that, when n is 3 or more, the $CX_2$ groups may form ringed moieties which may be aromatic.

In the multiamine derived cations the center for cationic activity is centered on the nitrogen groups in the multiamines. Generally, this is accomplished by protonating the multiamines to thereby form ammonium groups which are positively charged. This protonation has to take place before the cationic exchange can be made with the starting silicate gel.

As stated above, the starting silicate gel is reacted with a "source" of exchange cations derived from the guanidine and/or multiamine compounds as set forth above in order to effect an ion exchange between the guanidine and/or multiamine derived cations and the interstitial cations in the silicate gel to form exchanged macro flocculated particles which form the silicate matrix. The specific nature of the source will depend upon the exchange cation being utilized and can easily be determined by one skilled in the art. For example, if the exchange cation of choice is guanidinium or melaminium, the silicate will be reacted with the corresponding hydrochloride or any other corresponding compatible soluble salt.

As stated above, one or more exchange cations can be utilized in the cationic exchange reaction. Since the various cations will give a floc or matrix, and eventually end products, with differing physical properties, the specific cation or combination of cations will be chosen by the practitioner of this invention based on the desired end use.

In the preferred method of making the embedded fabric materials of the present invention, a layered silicate gel starting material is applied by any suitable method to at least one side of a suitable fabric to thereby cover the fibers from which the fabric is made and to completely fill the spaces between the fibers with the silicate gel. A cationic exchange reaction utilizing at least one species of a guanidine and/or multiamine derived cation is then carried out. For example, the silicate gel-coated fabric can be immersed in a solution of guanidine derived cations at room temperature for an amount of time sufficient to cause an ion exchange reaction to occur between at least some of the gel's interstitial ions and at least some of the guanidine derived cations to thereby form the embedded fabric material of the invention.

In an alternate method of making the materials of the present invention, the layered silicate gel starting material can be first reacted, generally with agitation, with a source of guanidine and/or multiamine derived exchange cations to form a flocced mineral suspension which can then be applied to at least one side of a fabric.

The term fabric as used in the specification and claims refers to a material constructed of a plurality of interlaced yarns, fibers, or filaments. The fabric used in this invention can be woven or non-woven with the yarns, fibers, or filaments being organic and/or inorganic. In general any fiber, filaments, or yarns present in such a way that the fibers, filaments or yarns are in the same plane and do not interfere with the film forming characteristics of the silicate starting material can be used to prepare smooth, flexible papers with good mechanical properties.

Examples of materials from which the fabrics can be made includes, but is not limited to, glass (such as glass webs), polyester, polyamides, polyolefins, polyacrylates, cellulose, rayon, and blends thereof. For the purposes of the present specification and claims, the terms web and mat, as in, for example, glass web or glass mat, are used interchangeably.

The materials of the present invention formed according to the procedures set forth above are fire resistant, exhibit good mechanical properties and have flexibility and smoothness. It has been discovered, however, that certain mechanical properties of such materials can be improved by laminating a compatible fire resistant swelled layered silicate film or coating to one or both sides of the material to form a laminate composite material which is within the scope of the present invention. Suitable compatible swelled layered silicate films that can be laminated to one or both sides of the embedded fabric material of the present invention include, but are not necessarily limited to, guanidine cation exchanged silicate films which are prepared according to procedures taught in copending application Ser. No. 662,057, filed Oct. 18, 1984, and multiamine cation exchanged silicate films which are prepared according to procedures taught in copending application Ser. No. 715,973, filed Mar. 25, 1985.

In addition, and depending upon the desired end use of the laminated materials, compatible organic or inorganic films or coatings other than swelled layered silicate films may be laminated to one or both sides of the embedded fabric materials by the present invention. For example, coatings which further improve the water resistance of the embedded fabric materials or laminated materials of this invention can be advantageously used. One example of such a coating is a polysiloxane/silica coating, which can be applied, for example, with a Byrd blade.

The term "water resistant" as used in the specification and claims is not meant to imply that the articles of the present invention are waterproof or are completely impervious to water. By contrast, the term is used to indicate that the materials do not substantially degrade, at least in their tensile strength, when exposed to water.

In these following Examples, unless otherwise specified, the starting material utilized was a lithium fluorhectorite made according to procedures taught in U.S. Pat. No. 4,239,519.

EXAMPLE 1

This example illustrates a method of producing a guanidinium exchanged fluorhectorite flocced silicate which can be directly applied to a fabric in accordance with the alternate method for preparing the materials of the present invention.

A slurry of guanidinium fluorhectorite was prepared by adding 475 grams of a 10% dispersion of lithium fluorhectorite to 1.4 liters of 1N guanidine hydrochloride solution. The slurry was then agitated with a high shear mixer to reduce the particle size of the resultant floc, which was washed and then analyzed for water content and diluted to result in a 2% solids slurry.

EXAMPLE 2

An inorganic paper-like material was prepared by coating, using a 4.5 mil Byrd blade, an $8\frac{1}{2}"\times 11"$4 mm thick non-woven glass mat with the slurry from Example 1. The coated mat was then air-dried resulting in a white inorganic paper-like material.

EXAMPLE 3

This example illustrates a method of producing a guanidine exchanged layered silicate film which can be used to form the laminate composite of the present invention.

A 10% solids lithium fluorhectorite gelled dispersion was prepared according to procedures taught in U.S. Pat. No. 4,239,519. A film was made of this material by using a 4.5 mil Byrd applicator, which was 5 inches wide, to draw down a $4\frac{1}{2}$ mil thick wet film of the dispersion on a glass plate. The glass plate, with the film attached, was then immersed in a 0.25M guanidinium hydrochloride solution to cause a cation exchange between the guanidinium cations and the fluorhectorite's interlayer cations. A skin was formed, seemingly instantaneously, on the film which indicated such an exchange was taking place. In 10 minutes the film was removed from the plate, washed in deionized water to remove residual salts, and dried. The film had good flexibility and strength retention when wet.

EXAMPLE 5

An inorganic paper was prepared by coating, using a 4.5 mil Byrd blade, an $8\frac{1}{2}"\times 11"$4mm thick non-woven glass mat with a 10% lithium fluorhectorite suspension. The coated glass mat was then immersed into 1000 mls of a 0.25M aqueous 60° C. solution of guanadine hydrochloride for 10 minutes resulting in the flocculation of the fluorhectorite via an ion exchange process. The guanidinium fluorhectorite mat was then removed from the salt solution and was washed with fresh water in order to remove any excess salt. The coated mat was then air dried resulting in a flexible smooth inorganic paper which was white in color.

EXAMPLE 6

$8\frac{1}{2}\times 11$ inch guanidinium fluorhectorite films were formed by drawing down a 10% lithium fluorhectorite suspension with a 4.5 mil Byrd blade onto an $8\frac{1}{2}\times 11$ inch glass plate followed by immersion of the coated plate into 1000 mls of a 0.25M aqueous 60° C. guanidine hydrochloride solution. After 10 minutes in the salt solution the glass plate containing the film was removed and excess salt was washed from the film by soaking it in a bath containing fresh water. Two guanidinium fluorhectorite films prepared in this manner were then laminated, one on each side of the guanidinium fluorhectorite mat which was prepared as described in Example 5. The films and mat were compressed together while wet using a roller press laminator. The resulting laminated guanidinium fluorhectorite mat was then either air or oven dried resulting in a strong, flexible, smooth inorganic paper which was white in color.

COMPARATIVE EXAMPLE

This comparative example illustrates the unsuitability, for technical processing reasons, of using polymeric amine compounds as exchange cations in the process of the present invention.

The procedure of Example 6 was followed exactly, except that the lithium pluorhectorite coated plate was immersed in 1000 mls of a 3% Kymene solution bath for 24 hours at 50° C. The resulting structure was not intact and collapsed when handled.

Applications

The inorganic paper as prepared in Examples 5 and 6 were tested for their usage as a substrate for recording information. These papers were typed on using an IBM typewriter equipped with regular carbon ribbon. They were written on and photocopied on using an ordinary ballpoint pen with blue ink and a Savin photocopying machine. In all tested cases, the letters typed, written or photocopied on the inorganic paper exhibited excellent visual contrast with the paper. Moreover, the carbon, ink, and photocopying machine toner all maintained good adhesion to the inorganic paper without smearing similar to that observed when regular bond paper is used. When other inorganic material, such as a glass-like ceramic surface, was similarly tested, poor adhesion of the ink or carbon was observed.

Flammability

The inorganic papers as prepared by the methods of Examples 5 and 6 were tested for flammability. Papers prepared in Examples 5 and 6 were typed on and then placed in the flame of a bunsen burner for 60 seconds. These experiments were then repeated using similar papers from Example 5 and 6 which were typed on after being coated with a polysiloxane/inorganic coating described in Example 9 below. Observations were then made with respect to (1) the ease of ignition and (2)

ability to read type after 60 seconds exposure to flame. These observations are recorded in the Table below.

TABLE

| Properties Monitored | Paper from Example | | | |
|---|---|---|---|---|
| | 5 | 6 | 5 (coated) | 6 (coated) |
| Ease of Ignition | N.I.<sup>a</sup> | N.I. | N.I. | N.I. |
| Ability to Read Type After 60 Sec. Exposure | Poor | Very Good | Fair | Very Good |

<sup>a</sup>No ignition even though paper glowed red

From the data above it is apparent that even though the paper became red hot upon prolonged heating no burning of the paper was detected. After cooling the papers remain intact and in the case where the laminated papers (Example 6) were used the letters typed on the paper are still readable.

Smoothness

Electron micrographs of papers prepared in Examples 5 and 6 show a very smooth surface as compared to sheets containing loose fibers. The papers prepared in this invention exhibit no voids on the surface as seen in the sheets containing loose fibers. Since the fibers used in this invention are parallel to the surface, interruption in the alignment of lamella during the preparation of papers does not occur, yielding a smooth surface.

EXAMPLE 7

A colored inorganic paper was made by adding 5% by weight of chromium oxide pigment to a 10% lithium fluorhectorite suspension. After mixing of the pigment with the lithium fluorhectorite suspension a paper was prepared by the method described in Example 11 using the colored lithium fluorhectorite suspension for the draw downs on the glass mats and plates. The final paper product had a green color.

EXAMPLE 8

The method of Example 7 was repeated except that a red iron oxide pigment was utilized instead of a chromium pigment. The final paper product had a red color.

EXAMPLE 9

The water and flame resistance of the inorganic papers prepared in Examples 5 and 6 was improved by coating both sides of the dried papers with a 1 mil thick, 30 percent solids solution of a 70/30 wt. parts polysiloxane/silica inorganic coating. The solvent was allowed to dry off. Upon treatment of these papers in this manner water no longer wet the paper but beaded upon the surface.

EXAMPLE 10

A paper-like material was prepared utilizing the process described in Example 5 except that the non-woven fabric was made of polyester.

EXAMPLE 11

A paper-like laminated composite was prepared by laminating a guanidinium film on each side of a guanidinium fluorhectorite coated fabric prepared according to Example 10.

EXAMPLE 12

A paper-like material was prepared utilizing the process described in Example 5 except that a woven fabric, rather than a nonwoven fabric, made of glass fibers was used.

EXAMPLE 13

A paper-like laminated composite was prepared by laminating a guanidinium film on each side of a guanidinium fluorhectorite coated fabric prepared according to Example 12.

EXAMPLE 14

A paper-like material was prepared according to the process described in Example 5 except that a three-dimensional fabric made of nylon was used.

EXAMPLE 15

A laminated composite was prepared by laminating a guanidinium film of a guanidinium fluorhectorite coated fabric prepared according to Example 14.

Mechanical Properties

The dry and wet tensile strength of the above material and regular bond paper are given below:

| Mechanical Properties The dry and wet tensile strength of the above material and regular bond paper are given below: | | |
|---|---|---|
| Paper Type | Dry Tensile (PSI) | Wet Tensile (PSI)* |
| Example 5 | 2330 | 555 |
| Example 6 | 3770 | 600 |
| Example 12 | 7330 | 4800 |
| Bond Paper | 3600 | 228 |

*Submerged in water for 24 hours before testing

As seen from the above table materials comprising a fabric embedded in a silicate matrix exhibit dry and wet tensile strengths very close or higher to those of conventional bond paper.

EXAMPLE 16

An inorganic paper was prepared by coating, using a 4.5 mil Byrd blade, an 8½×11"4 mm thick non-woven glass mat with a 10% lithium fluorhectorite suspension. The coated glass mat was then immersed into 1000 mls of a 0.25M aqueous 60° C. solution of hexamethylenediammonium dihydrogen chloride for 10 minutes resulting in the flocculation of the fluorhectorite via an ion exchange process. The guanidinium fluorhectorite mat was then removed from the salt solution and was washed with fresh water in order to remove any excess salt. The coated mat was then air dried resulting in a flexible, smooth inorganic paper white in color.

EXAMPLE 17

8½×11 inch hexamethylenediammonium fluorhectorite films were formed by drawing down a 10% lithium fluorhectorite suspension with a 4.5 mil Byrd blade onto an 8½×11 inch glass plate followed by immersion of the coated plate into 1000 mls of a 0.25M aqueous 60° C. hexamethylenediammonium dihydrogen chloride solution. After 10 minutes in the salt solution the glass plate containing the film was removed and excess salt was washed from the film by soaking it in a bath containing fresh water. Two hexamethylenediammonium fluorhectorite films prepared in this manner were then laminated, one on each side of the hexamethylenediammonium fluorhectorite mat which was prepared as described in Example 16. The films and mat were compressed together while wet using a roller press laminator. The resulting laminated hexamethylenediammonium fluorhectorite mat was then either air or oven dried resulting in a strong, flexible, smooth inorganic paper which was white in color.

EXAMPLE 18

8½×11 inch guanidinium fluorhectorite films were formed by drawing down a 10% lithium fluorhectorite suspension with a 4.5 mil Byrd blade onto an 8½×11 inch glass plate followed by immersion of the coated plate into 1000 mls of a 0.25M aqueous 60° C. guanidine hydrochloride solution. After 10 minutes in the salt solution the glass plate containing the film was removed and excess salt was washed from the film by soaking it in a bath containing fresh water. Two guanidinium fluorhectorite films prepared in this manner were then laminated, one on each side of the hexamethylenediammonium fluorhectorite mat which was prepared as described in Example 16. The films and mat were compressed together while wet using a roller press laminator. The resulting laminated guanidinium fluorhectorite mat was then either air or oven dried resulting in a strong, flexible, smooth inorganic paper which was white in color.

EXAMPLE 19

This example illustrates laminating an organic film to an embedded fabric material of the present invention.

A laminated composite material was prepared by first forming an embedded fabric material according to the procedure of Example 5. A 1 mil thick polyvinylidene fluoride film was laminated by using a hot press at 10,000 psi and 300° F. for 10 minutes.

What is claimed is:

1. A fire-resistant paper-like material, which coprises a fabric embedded in a layered silicate material wherein the silicate is selected from synthetic mica and vermiculite and wherein the silicate material has interstitial cations selected from (1) cations of guanidine, aminoguanidine, diaminoguanide, methyl-guanidine, tetramethylguanidine, melamine, 2-aminopyridine, and 2,6-diaminopyridine; and (2) a protonated diamino functional compound having the formula:

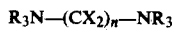

wherein (a) each $R_3$ is hydrogen, (b) each X is hydrogen, and (c) n represents an integer from 2 to 15.

2. The material of claim 1 wherein the interstitial cations selected are from (1), and the silicate is vermiculite.

3. The material of claim 1 wherein the interstitial cations selected are from (1) and the silicate is synthetic mica.

4. The material of claim 1 wherein the interstitial cations selected are from (2) and the silicate is vermiculite.

5. The material of claim 1 wherein the interstitial cations selected are from (2) and the silicate is synthetic mica.

6. The material of claim 1 wherein the fabric is made from a material selected from the group consisting of: glass, polyester, polyamides, polyolefins, polyacrylates, cellulose, and rayon.

7. The material of claim 2 wherein the fabric is made from a material selected from the group consisting of: glass, polyester, polyamides, polyolefins, polyacrylates, cellulose, and rayon.

8. The material of claim 3 wherein the fabric is made from a material selected from the group consisting of: glass, polyester, polyamides, polyolefins, polyacrylates, cellulose, and rayon.

9. The material of claim 4 wherein the fabric is made from a material selected from the group consisting of: glass, polyester, polyamides, polyolefins, polyacrylates, cellulose, and rayon.

10. The material of claim 5 wherein the fabric is made of a material selected from the group consisting of: glass, polyester, polyamides, polyolefins, polyacrylates, cellulose, and rayon.

11. The material of claim 1 wherein the cation is selected from (1).

12. The material of claim 1 wherein the cation is selected from (2).

13. A method of preparing a fire-resistant paper-like material comprising:
(a) coating a fabric with a swelled layered silicate gel, said silicate selected from synthetic mica and vermiculite, wherein further said silicate contains exchangeable interstitical cations, and (b) reacting the swelled layered silicate with cations selected from: (1) cations of: guanidine, aminoguanidine, diaminoguandine, methylguanidine, tetramethylguanidine melamine, 2-aminopyridine, and 2,6-diaminopyridine, and (2) a protonated diamino compound having the formula:

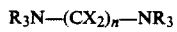

wherein each $R_3$ is hydrogen, each X is hydrogen, and n represents an integer from 2 to 15; whereby an ion exchange reaction occurs between at least some of the exchangeable interstitial ions and at least some of the selected cations to form a layered silicate matrix.

14. A method as described in claim 13 wherein the cations under (b) are from group (1).

15. A method as described in claim 13 wherein the cations under (b) are from group (2).

16. A method as described in claim 14 wherein the silicate selected is a synthetic mica.

17. A method as described in claim 14 wherein the silicate selected is vermiculite.

18. A method as described in claim 15 wherein the silicate selected is a synthetic mica.

19. A method as described in claim 15 wherein the silicate selected is vermiculite.

20. A method of preparing a fire-resistant paper-like material, comprising: embedding a fabric in a swelled-layered silicate material wherein the silicate is a synthetic mica and wherein the silicate contains interstitial cations selected from (1) cations of guanidine, aminoguanidine, diaminoguanidine, methylguanidine, tetramethylguanidine, melamine, 2-aminopyridine, and 2,6-diaminopyridine; and (2) a protonated diamino functional compound having the formula:

wherein each $R_3$ is hydrogen, each X is hydrogen, and N represents an integer from 2 to 15.

21. A method as described in claim 20 wherein the cations are from group (1).

22. A method as described in claim 20 wherein the cations are from group (2).

* * * * *

UNITED STATES PATENT AND TRADEMARK OFFICE
CERTIFICATE OF CORRECTION

PATENT NO. : 4,746,403
DATED : May 24, 1988
INVENTOR(S) : Kenneth K. Ko et al

It is certified that error appears in the above-identified patent and that said Letters Patent are hereby corrected as shown below: On the Title Page:

On the front page of the patent, the inventor "Richard A. Brubacker" should read --Richard A. Brubaker--.

In the Specification, in column 7, Example 7, line 31, the amount "5%" should read --.5%--; in column 8, Example 15, lines 20-23, delete the words "Mechanical Properties - The dry and wet tensile strength of the above material and regular bond paper are given below:", as this is a duplication.

In the Claims, in claim 1, line 36, the word "coprises" should be --comprises--.

Signed and Sealed this

Eleventh Day of October, 1988

Attest:

DONALD J. QUIGG

Attesting Officer

Commissioner of Patents and Trademarks